(12) United States Patent
Benczkowski et al.

(10) Patent No.: US 8,668,084 B2
(45) Date of Patent: Mar. 11, 2014

(54) SYSTEM FOR THE IDENTIFICATION OF DIFFERENT FASTENING ELEMENTS

(75) Inventors: Kenneth Benczkowski, Buffalo, NY (US); Brian O'Rourke, Omaha, NE (US); Mark A. Willer, Jr., Denver, CO (US)

(73) Assignee: Broetje Automation GmbH, Wiefelstede (DE)

( * ) Notice: Subject to any disclaimer, the term of this patent is extended or adjusted under 35 U.S.C. 154(b) by 798 days.

(21) Appl. No.: 12/828,415

(22) Filed: Jul. 1, 2010

(65) Prior Publication Data

US 2011/0056860 A1 Mar. 10, 2011

(30) Foreign Application Priority Data

Sep. 4, 2009 (EP) ..................... 09169499

(51) Int. Cl.
*B65D 90/00* (2006.01)
(52) U.S. Cl.
USPC .................... 206/338; 206/459.1
(58) Field of Classification Search
USPC ......... 206/338, 341, 343, 345, 347, 561, 562, 206/563, 459.5, 459.1
See application file for complete search history.

(56) References Cited

U.S. PATENT DOCUMENTS

| | | | | |
|---|---|---|---|---|
| 4,832,842 A * | 5/1989 | Limb | ............................ | 210/249 |
| 5,004,103 A * | 4/1991 | Connors et al. | ............... | 206/372 |
| 5,047,019 A * | 9/1991 | Sincock | ......................... | 604/192 |
| 5,050,756 A * | 9/1991 | Tielker et al. | ................. | 220/23.4 |
| 5,373,939 A * | 12/1994 | Bloomgren | .................... | 206/341 |
| 5,642,816 A * | 7/1997 | Kelly et al. | .................. | 211/60.1 |
| 5,685,438 A * | 11/1997 | Emanuel et al. | ............. | 211/70.1 |
| 5,975,295 A * | 11/1999 | Diamond | ....................... | 206/366 |
| 6,164,448 A * | 12/2000 | Schmutz et al. | .............. | 206/488 |
| 8,061,517 B2 * | 11/2011 | Loeffler et al. | ............... | 206/339 |
| 2009/0158577 A1 * | 6/2009 | Schweikle | ...................... | 29/428 |
| 2011/0056858 A1 * | 3/2011 | Benczkowski et al. | ........ | 206/338 |
| 2011/0056860 A1 * | 3/2011 | Benczkowski et al. | ..... | 206/459.5 |

FOREIGN PATENT DOCUMENTS

| | | |
|---|---|---|
| DE | 849 069 | 9/1952 |
| DE | 37 02 061 | 8/1987 |
| DE | 37 25 588 | 2/1989 |
| DE | 103 20 557 | 12/2004 |
| DE | 20 2004 007 880 | 10/2005 |
| EP | 0 278 324 | 8/1988 |
| EP | 2 029 461 | 3/2009 |
| EP | 2 072 180 | 6/2009 |
| FR | 2 731 938 | 9/1996 |

* cited by examiner

Primary Examiner — David Fidei
(74) Attorney, Agent, or Firm — Michael J. Striker

(57) ABSTRACT

A system for identification of different fastening elements used for connecting of components of a unit to be assembled has a receptacle to receive different fastening elements which differ from each other with regard to shape and/or size and/or material and are coordinated to the components which are respectively to be connected so that the number of fastening elements which are able to be received by the receptacle corresponds at least to the number of connection sites on the components, a housing which serves to receive the receptacle, and identification elements to display the individual charging position of a fastening element in the receptacle.

17 Claims, 13 Drawing Sheets

SYSTEM FOR THE IDENTIFICATION OF DIFFERENT FASTENING ELEMENTS

CROSS-REFERENCE TO RELATED APPLICATION

The invention described and claimed hereinbelow is also described in European Patent Application EP09169499.2 filed on Sep. 4, 2009. This European Patent Application, whose subject matter is incorporated here by reference, provides the basis for a claim of priority of invention under 35 U.S.C. 119(a)-(d).

BACKGROUND OF THE INVENTION

The invention relates to a system for the identification of different fastening elements which are used for the connecting of components of a unit which is to be assembled.

Containers are known from DE 20 2004 007 880 U1 which are joined together arbitrarily for the depositing of small parts in the manner of a setting case, in which projections and recesses are arranged on the side walls of the containers, which are brought into engagement with complementary recesses or projections. Containers which are arbitrarily composed to form a setting case have the disadvantage that a structured depositing of fastening elements which are used for the connection of two components of a unit which is to be assembled, particularly in aircraft construction, proves to be unsuitable, when for the connection of two components a systematic choice of fastening elements which are to be used must take place by a fitter. This is to be seen against the background that the fastening elements are dimensioned according to their use at the various connection sites of the different components, wherein an identification of the fastening element to be processed at a specific connection site of a particular component by visual differentiation of the fastening elements from each other by the fitter is very prone to error and is often not able to be carried out due to the negligible nature of the variations.

SUMMARY OF THE INVENTION

It is therefore an object of the invention to avoid the described disadvantage of the prior art and in particular to propose a system for the identification of different fastening elements which makes possible a clear and quick identification of differently dimensioned fastening elements from a plurality of fastening elements held in a receptacle.

According to the invention, a system is proposed for the identification of different fastening elements, which is characterized by a receptacle to receive different fastening elements which differ from each other with regard to shape and/or size and/or material, wherein the different fastening elements with which the receptacle is charged are coordinated with the components which are respectively to be connected, and the number of fastening elements able to be received by the receptacle corresponds at least to the number of connection sites on the components, further characterized by a housing which serves to receive the receptacle, and by identification elements to display the individual charging position of a fastening element in the receptacle.

The system according to the invention makes possible the simple and clear identification of an individual fastening element among a plurality of different fastening elements, which are dimensioned as a function of the components which are to be connected and are embodied as a so-called fastening element kit.

Such a fastening element kit comprises the receptacle by which at least all the fastening elements necessary for the connection of two specific components are able to be received separately from each other, in order to facilitate for a fitter the choice of a fastening element allocated to a particular connection site on the components, from the different fastening elements necessary for the connection. Through the identification elements in the housing receiving the receptacle, the respective charging position of a fastening element can be displayed, so that the fitter can systematically remove from the receptacle the fastening element which must be used at a particular connection site of the components.

In particular, at least one corresponding identification element in the receptacle can be allocated respectively to a charging position of a fastening element. Through the allocation at least of one identification element to a respective charging position, the respective fastening element can be identified in clear allocation to a connection site of the components.

For this, the system can comprise a control arrangement coordinated with an optical projection system for determining and detecting a fastening element which is to be used at a respective connection site, which serves to control the identification elements. The fastening element to be used for the pending processing step is identified in the receptacle by means of the control arrangement, coupled or coordinated with the projection system, in accordance with the processing sequence for the connecting of the components. For this, the respective charging layout of a receptacle which is introduced into the housing is deposited in the control arrangement.

For a simplified embodiment of the housing, the identification elements can be arranged in a horizontal plane in the housing. In particular, the identification elements are arranged on the floor of the housing.

The receptacle which is held in the housing can preferably be arranged parallel to the identification elements. In particular, the housing and the receptacle can be connected with each other in a form-fitting manner. The charging of the receptacle is oriented to a charging layout which is deposited in the control arrangement of the housing. Through the skewed introduction of the receptacle into the housing, the charging layout differs from the expected charging layout, so that through the controlling of an identification element, an incorrect fastening element would be displayed. Through the form-fitting connection of housing and receptacle, an erroneously skewed insertion of the charged receptacle can be avoided.

In an advantageous further development, the receptacle can be embodied so as to be transparent on its side of the housing facing the identification elements. Thereby, the identification elements can be embodied as lighted elements such as light-emitting diodes (LED) or as incandescent lamps, in particular miniature incandescent lamps, whereby the charging positions are able to be displayed individually. In particular, in addition to the small installation space, the LEDs are distinguished by their longevity, so that the housing is frequently reusable.

The identification elements can preferably be embodied as two or more groups of diodes (LED) or incandescent lamps emitting different coloured light respectively. In this way, two or more fitters can have access in parallel to the kit arranged in the housing and can select individually the fastening elements necessary for them respectively for the connection of components.

Furthermore, the housing can have a data evaluation arrangement which evaluates a coding element arranged on the receptacle. In this way, it can be ensured that a receptacle which is charged as a kit, on its insertion into the housing, can be clearly allocated as intended to components which are to be connected with each other.

For this, the coding element can be embodied as a RFID chip or as a machine-readable code which is able to be applied on the receptacle. Through the coding, the control arrangement can determine the charging layout of the receptacle currently situated in the housing, in order to control the identification elements in a corresponding manner.

In addition, the receptacle can have a base element and a frame-like covering element, between which an insert which is provided with openings is able to be introduced, which serves to receive different fastening elements. In order to ensure the identifiability of the charging positions, the insert can consist of a transparent material.

Alternatively, the receptacle can be embodied as a frame which is divided in its interior by a cross-piece or several cross-pieces into a number of compartments corresponding at least to the number of different fastening elements which are to be received, into which respectively a container, embodied as a receiving element, to receive identical fastening elements is able to be inserted. The containers can be embodied so as to be transparent here on their side facing the identification elements.

In a further embodiment, provision is made that the receptacle is embodied as a frame which is divided in its interior by a cross-piece or several cross-pieces into a number of compartments corresponding at least to the number of different fastening elements which are to be received, which are closed on one side by at least one base element. Here, also, the base element is embodied so as to be transparent, in order to be able to guarantee the functionality of the system.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

FIGS. 1 to 6 show a receptacle 1 for receiving different fastening elements 50, such as for example rivet elements or bolts, which are used for the connecting of components to a unit, as is the case in particular in the assembly of aircraft or in the automotive field. In the assembly of components of an aircraft, such as for example the assembly of a wing or of parts of the fuselage of the aircraft, a multiplicity of different fastening elements 50 are worked with, which differ from each other in particular with regard to their shape, their size or the material of which they consist, or respectively their dimensioning. The number of dimensioning of the different fastening elements 50 which are to be processed is dependent on the components which are to be connected with each other. The number of different fastening elements 50 which are to be processed is determined as a function of the number of connection sites on the components. Furthermore, the specific conditions of the components, such as for example the material thickness, are to be taken into account at the connection sites, in order to process the suitable fastening element with regard to its dimensioning at the respective connection site.

Figure 1:
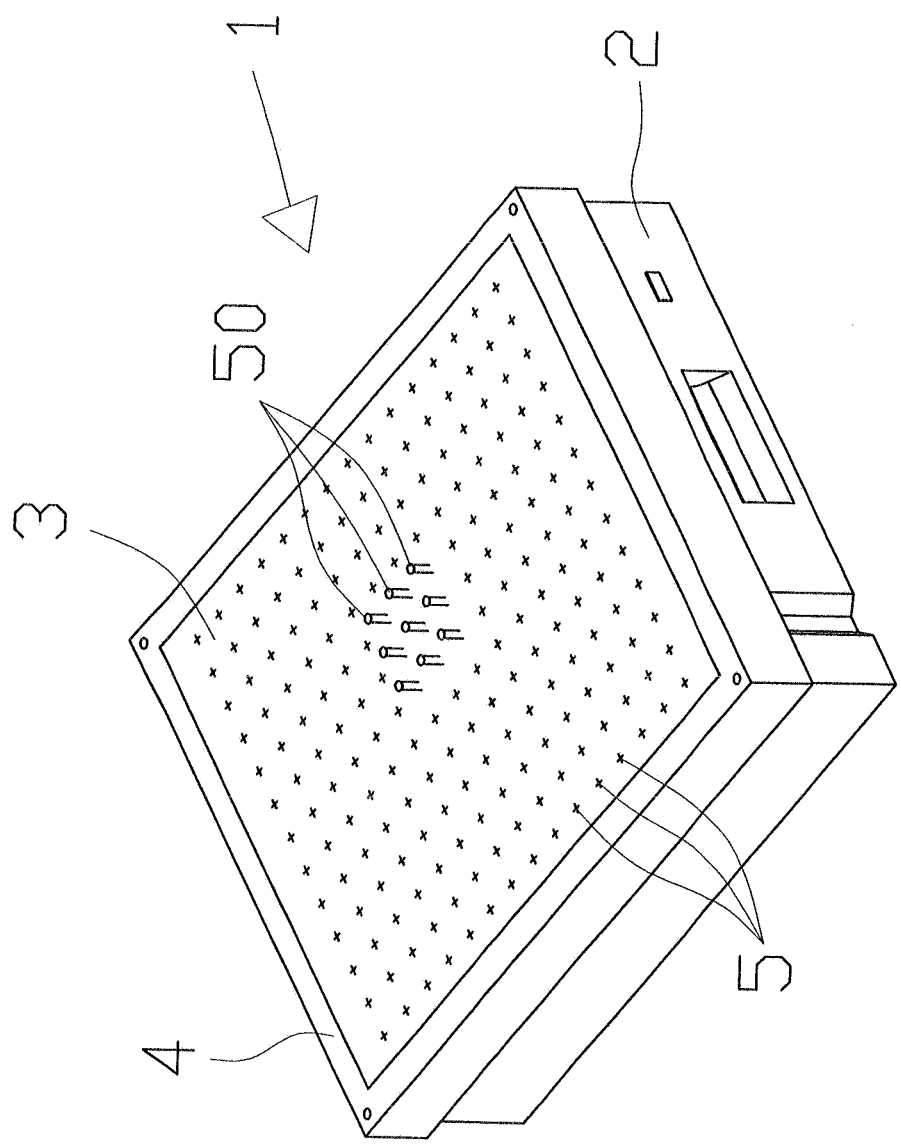
FIG. 1 shows a perspective view of a receptacle for receiving fastening elements.

The receptacle 1 illustrated in FIG. 1 comprises a base element 2, an insert 3 which serves to receive fastening elements 50, and a cover element 4. To receive the fastening elements 50, cruciform openings 5 are arranged in the insert 3, spaced uniformly from each other, into which respectively a fastening element 50 can be introduced and can be hold substantially force-fitting. The base element 2 illustrated in FIGS. 2 to 4 can be able to be produced for example by die casting, or can have a solid body which is subsequently processed.

Figure 4:
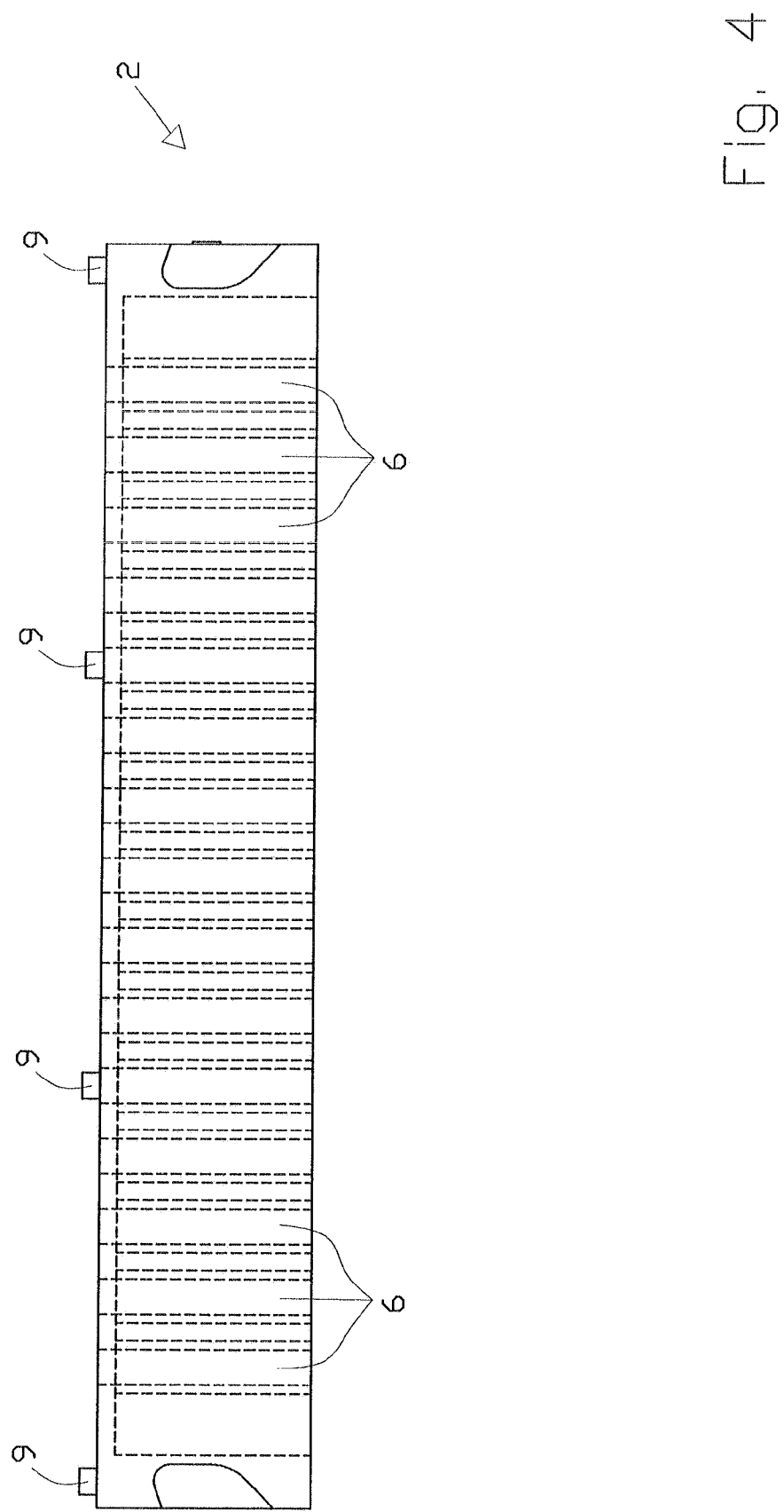
FIG. 4 shows a side view of the base element according to FIG. 2.

The base element 2 is provided with tubular through-bores 6, as are indicated by dashed lines in FIG. 4, or it can be provided with passages in the case of a solid embodiment of the body of the base element 2.

Figure 2:
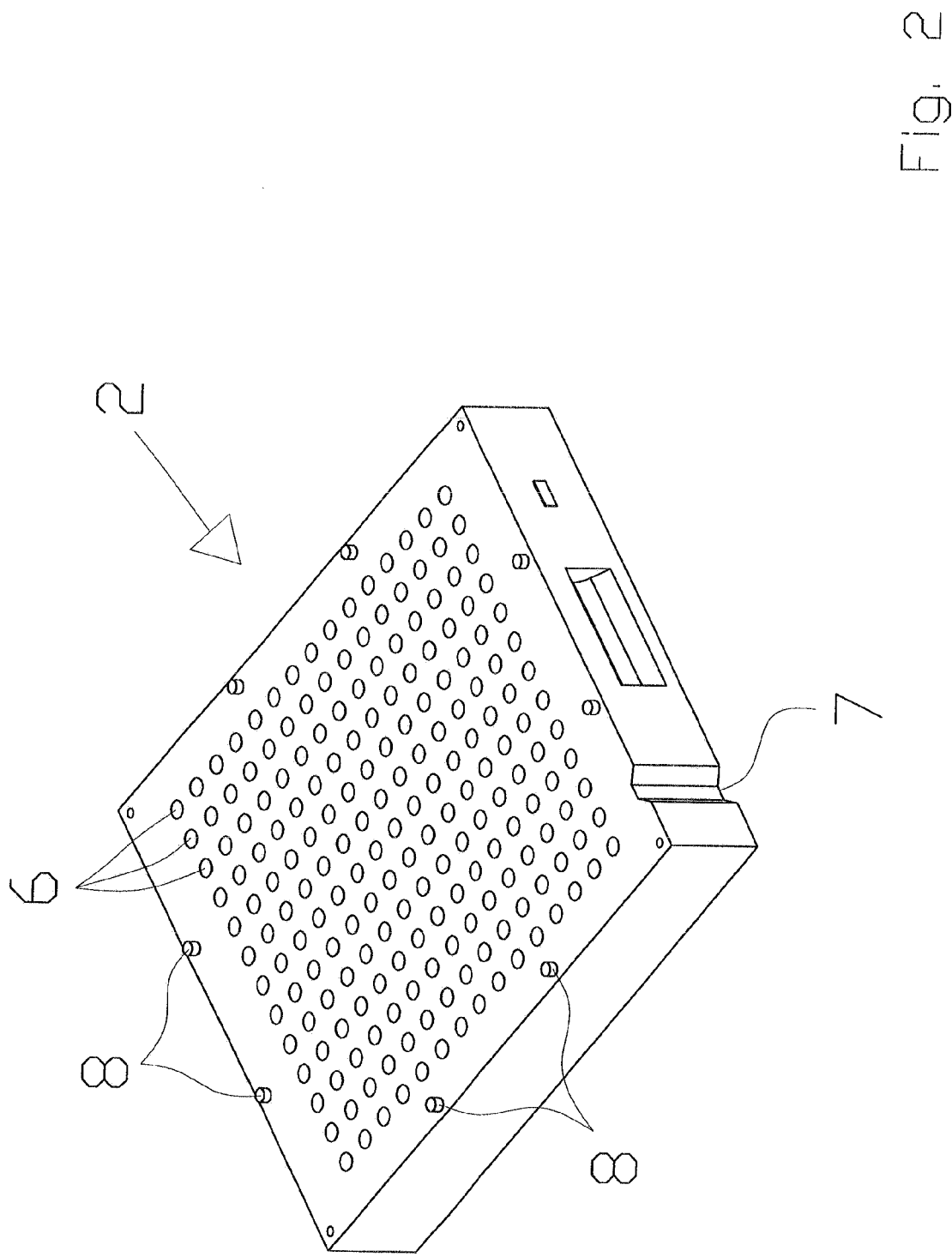
FIG. 2 shows a perspective view of a base element of the receptacle according to FIG. 1.
Figure 3:
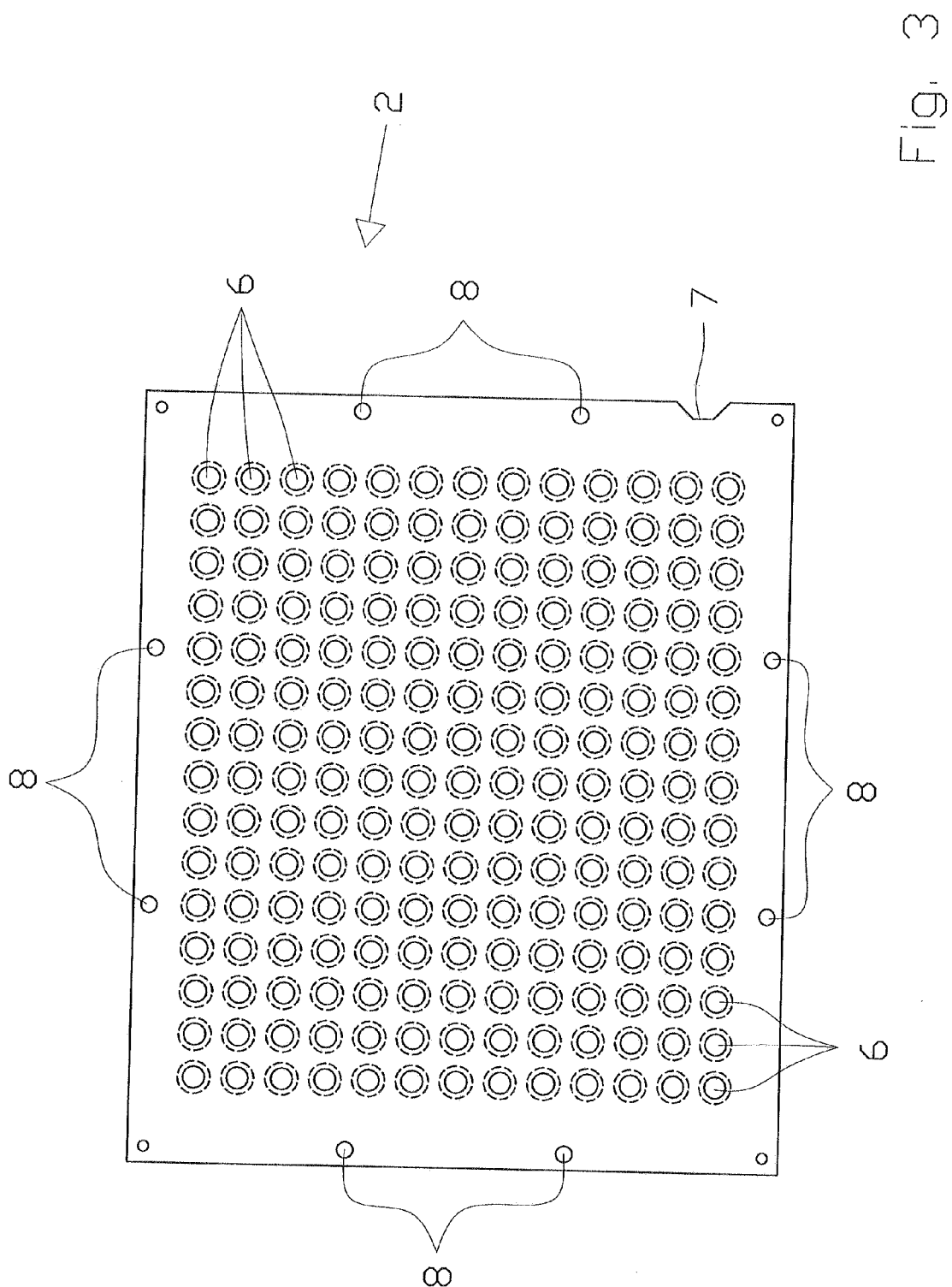
FIG. 3 shows a view from above onto the base element according to FIG. 2.

In the joined-together state of base element 2, insert 3 and cover element 4, the through-bores 6 correspond to the cruciform openings 5 of the insert 3 with regard to number and position. Here, the fastening elements 50 extend at least partially into the through-bores 6. The base element 2 can have at least one recess 7 and/or a projection on at least one vertical outer surface, as is indicated in FIGS. 2 and 3. If a recess 7 and/or a projection is provided on more than one outer surface of the base element 2, these differ on the respective outer surfaces with regard to their contour, in order to achieve a clear spatial alignment of the base element 2.

Figure 5:
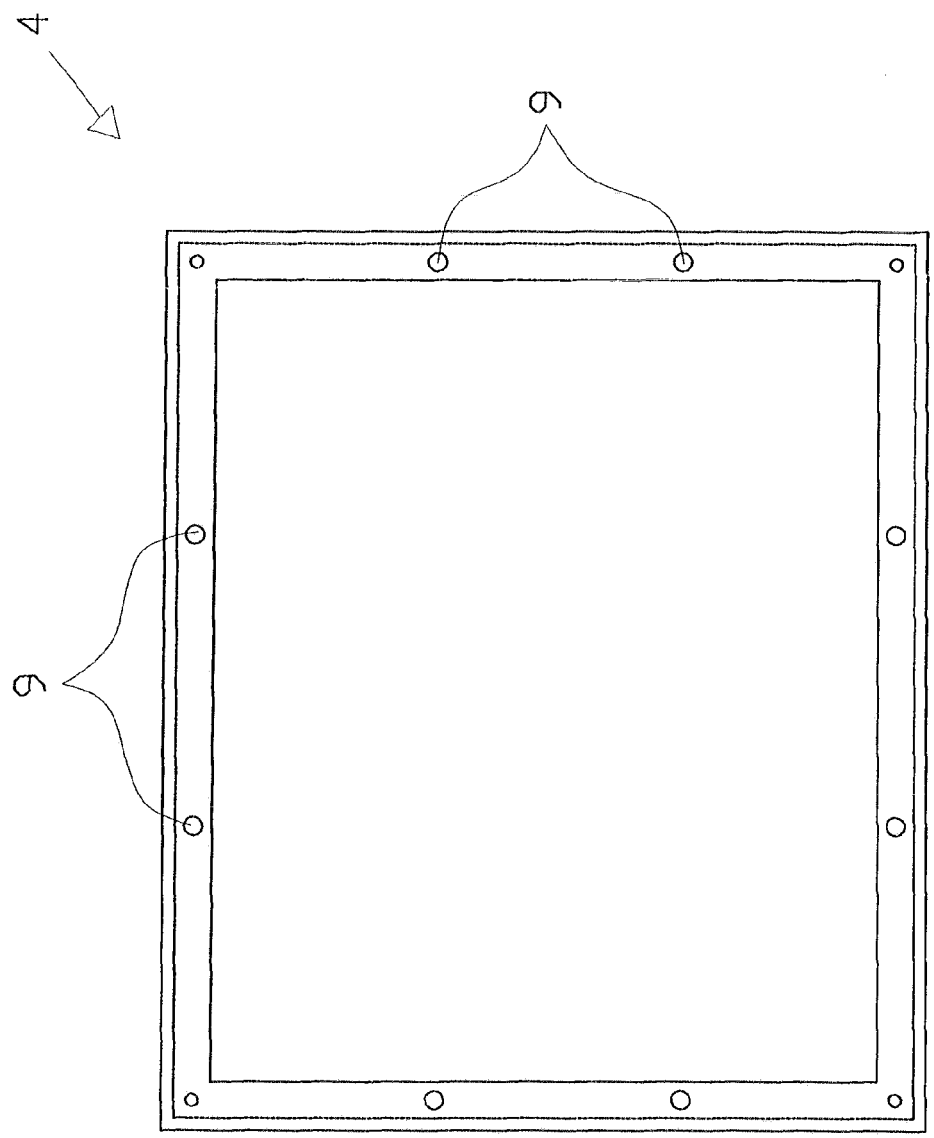
FIG. 5 shows a view from above onto a cover element of the receptacle according to FIG. 1.

The cover element 4 illustrated in FIG. 5 is constructed as an open frame which serves for fixing the insert 3 on the base element 2 in its marginal region. The opening in the frame-shaped cover element makes possible the unrestricted access to the fastening elements 50 in the insert 3 which is situated therebeneath. The base element 2, the insert 3 and the cover element 4 are connected with each other in the joined-together state by detachable connection means, such as screws or suchlike, in order to ensure a secure transportation of the receptacle 1. To prevent the insert 3 from being able to slip on being brought up onto the base element 2, the base element 2 has pins or locators 8 arranged on its upper side, which are able to be brought into engagement with corresponding bores 9 in the insert 3 and the cover element 4.

Figure 6:
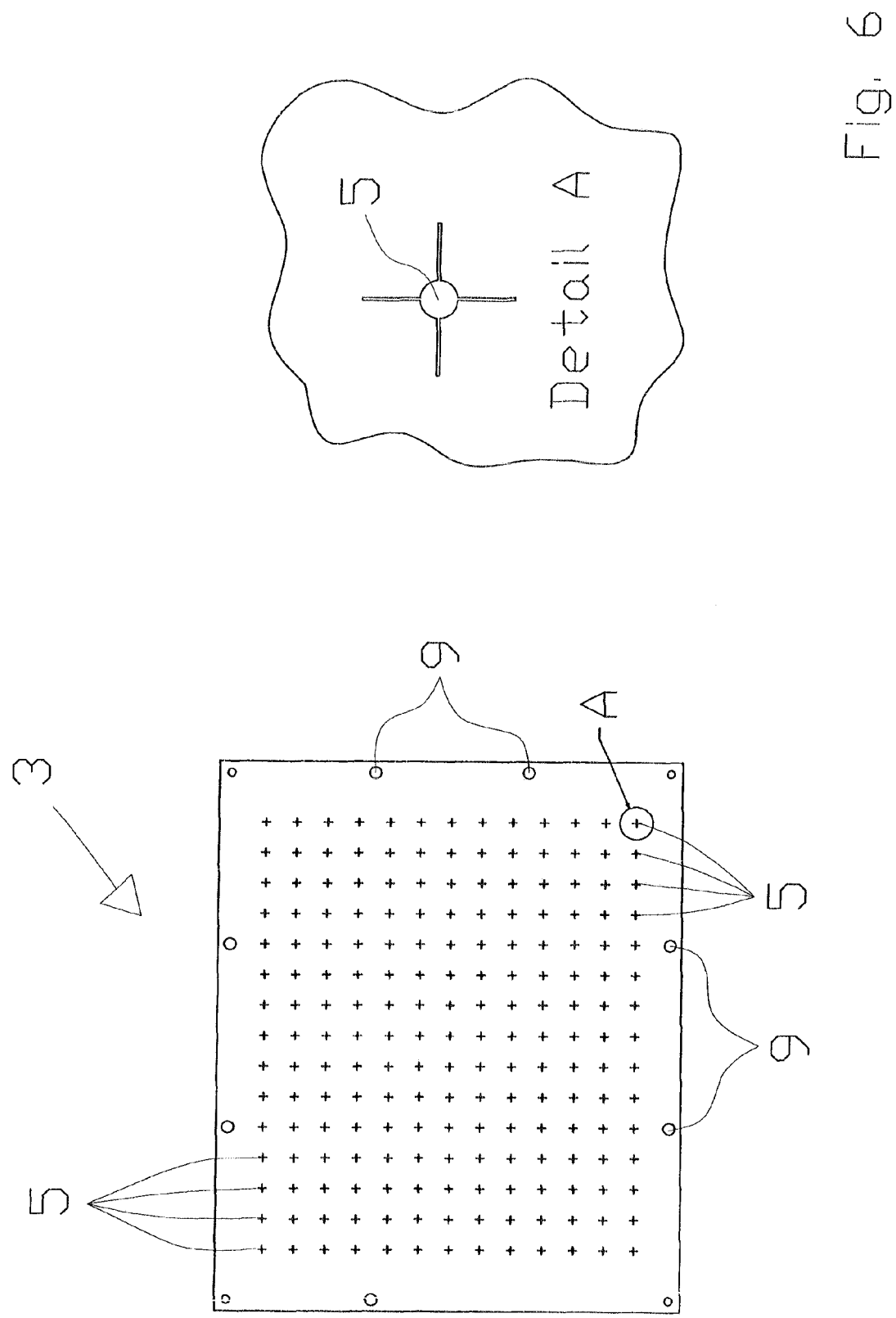
FIG. 6 shows a view from above onto an insert of the receptacle according to FIG. 1.

The insert 3 illustrated in FIG. 6 is embodied as a foil or as a plate and consists of an elastic plastic. The insert 3 is preferably embodied so as to be transparent here. Owing to the elasticity of the plastic of which the insert 3 preferably consists, the fastening elements 50 are clamped in the cruciform openings 5 of the insert 3, of which an opening 5 is illustrated on an enlarged scale in the detail view A. By the substantially force-fitting securing of the fastening elements 50 in the insert 3, the fastening elements 50 can be arranged so as to be elevated with respect to the surface of the insert 3, i.e. the fastening elements 50 protrude slightly above the surface of the insert 3. In this way, the fastening elements 50 can be more easily grasped by a fitter and removed from the receptacle 1. In addition, differently dimensioned fastening elements 50 can be clamped securely in the cruciform openings 5 in a simple manner, because the opening width is adapted individually.

The insert 3 is accorded further functions in addition. Thus, the insert 3 serves to secure the fastening elements 50 reliably in the receptacle 1 against falling out during transportation. Furthermore, the fastening elements 50 are subjected to a series of processes, such as a cleaning in an ultrasonic bath, a chemical treatment, such as for example etching or the application of an adhesive agent, or a drying in an air stream. For this, the receptacle 1, which is charged with the fastening elements 50, is fed as a whole to the individual process stations. The through-bores 6 of the base-element 2 enable the unresisted feeding and draining of a fluid, which can pass the housed fastening elements 50. During the carrying out of the processes, the fastening elements 50 are separated from each other by the insert 3 so that the carrying out of the processes is neither influenced nor impeded.

Advantageously, only the insert 3 which is able to be removed from the receptacle 1 is embodied as an expendable part which is to be regularly exchanged, whereas the base element 2 and the cover element 4 of the receptacle 1 are re-usable, which can be achieved by a chemical resistance of the materials which are used as the manufacturing materials for the base element 2 and the cover element 4.

Figure 7:
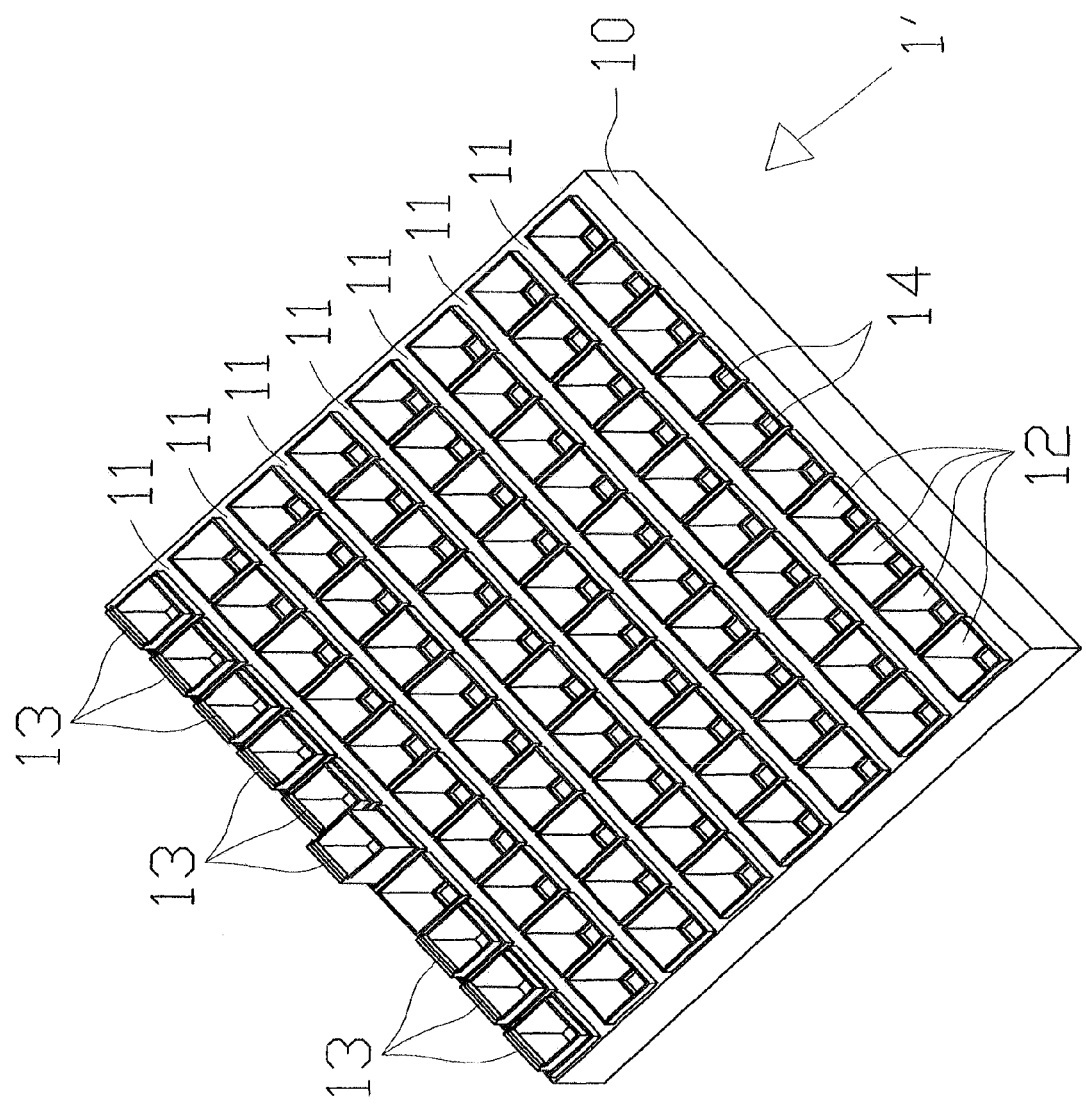
FIG. 7 shows a perspective view of a second embodiment of a receptacle.

In FIG. 7, a second embodiment of a receptacle 1' for receiving fastening elements 50 is illustrated in perspective view. The receptacle 1' is a frame 10 which is divided in its interior by a cross-piece 11 or several cross-pieces 11 into a number of compartments 12 corresponding to at least the number of different fastening elements 50 which are to be received. A container 13, embodied as a receiving element, open towards one side, for receiving identical fastening elements 50, is able to be respectively inserted into the respective compartment 12. For this, the substantially grid-shaped frame 10 has an encircling projection 14 in the respective compartments 12 on one of the two open sides, on which projection the container 13 can rest which is inserted into the compartment 12. Alternatively, the container 13 can be embodied with an encircling projection by which the container 13 can rest on the frame 10 or respectively on the cross-pieces 11 delimiting the respective compartment 12. The container 13 is able to be closed by a cover, in order to prevent fastening elements 50 from falling out during a transportation.

Figure 8:
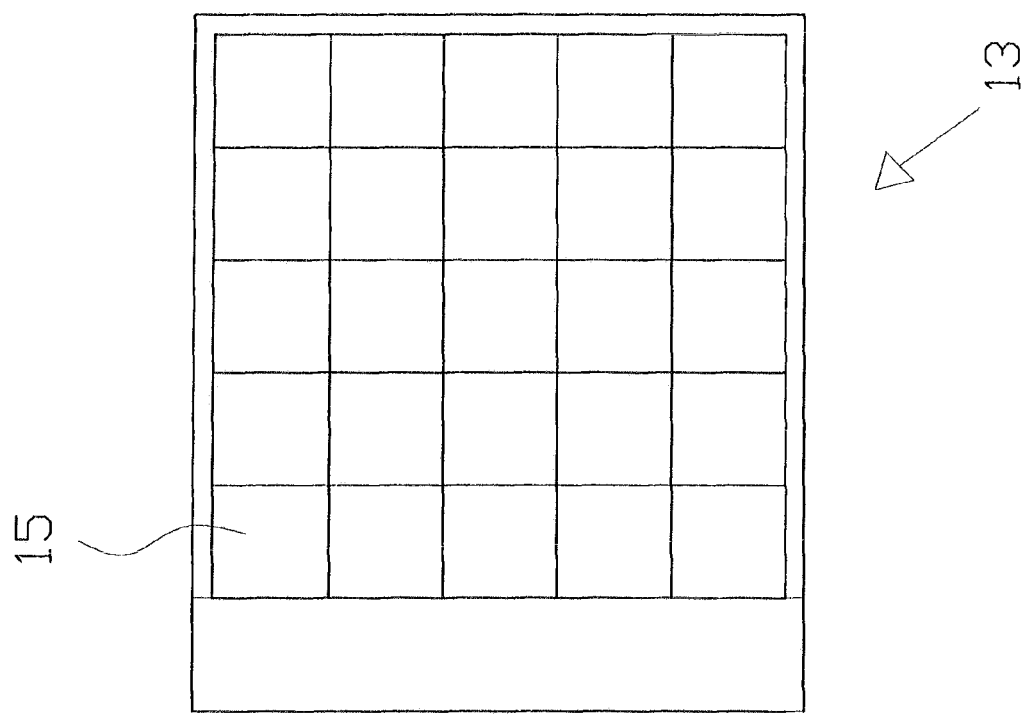
FIG. 8 shows a view from above onto a container according to FIG. 7.
Figure 9:
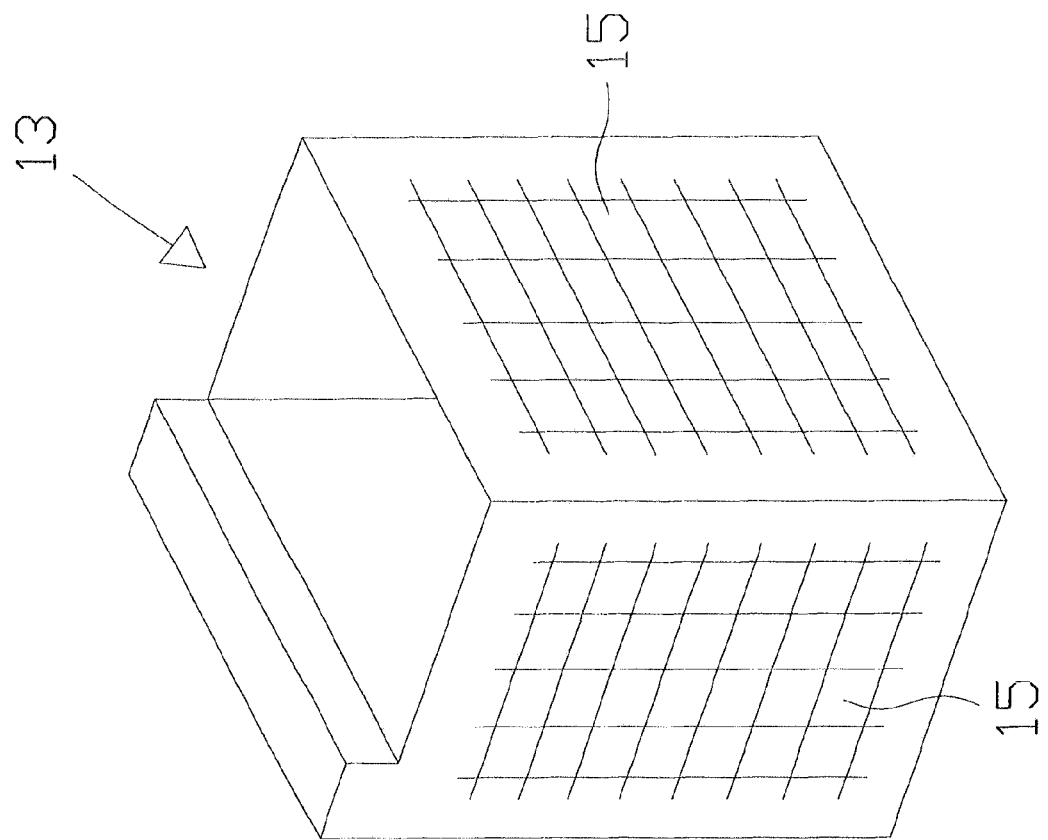
FIG. 9 shows a perspective view of a container according to FIG. 7.

The container 13 is provided with at least one wall 15 which is permeable to a fluid, in order to be able to subject the fastening elements 50 which are received by the container 13 to a chemical or other treatment. Preferably for this at least the bottom of the container 13, which stands on the encircling projection 14 of the frame 10, is embodied as a grid 15 or screen so as to be permeable to fluid, so that the frame 10 together with the containers 13 filled with fastening elements 50 received thereby is accessible to a fluid, such as a liquid or a stream of air, as is illustrated in FIG. 8. Furthermore, the lateral walls 15 of the container 13 can also be permeable to fluid, which is indicated in FIG. 9, in which these are also embodied as grids 15 or as screens.

The containers 13 can be removed from the frame 1' by the fitter for the process of the joining together of components, so that the fitter can work with the fastening elements 50, introduced in the respective container 13, with a particular dimension at all connection sites of the components which require this specific type of fastening element. Following on therefrom, the respective container 13 is inserted into the frame 10 again, in order to be able to be charged again at a later time in a composite which is used for this, which is explained in further detail below.

Figure 10:
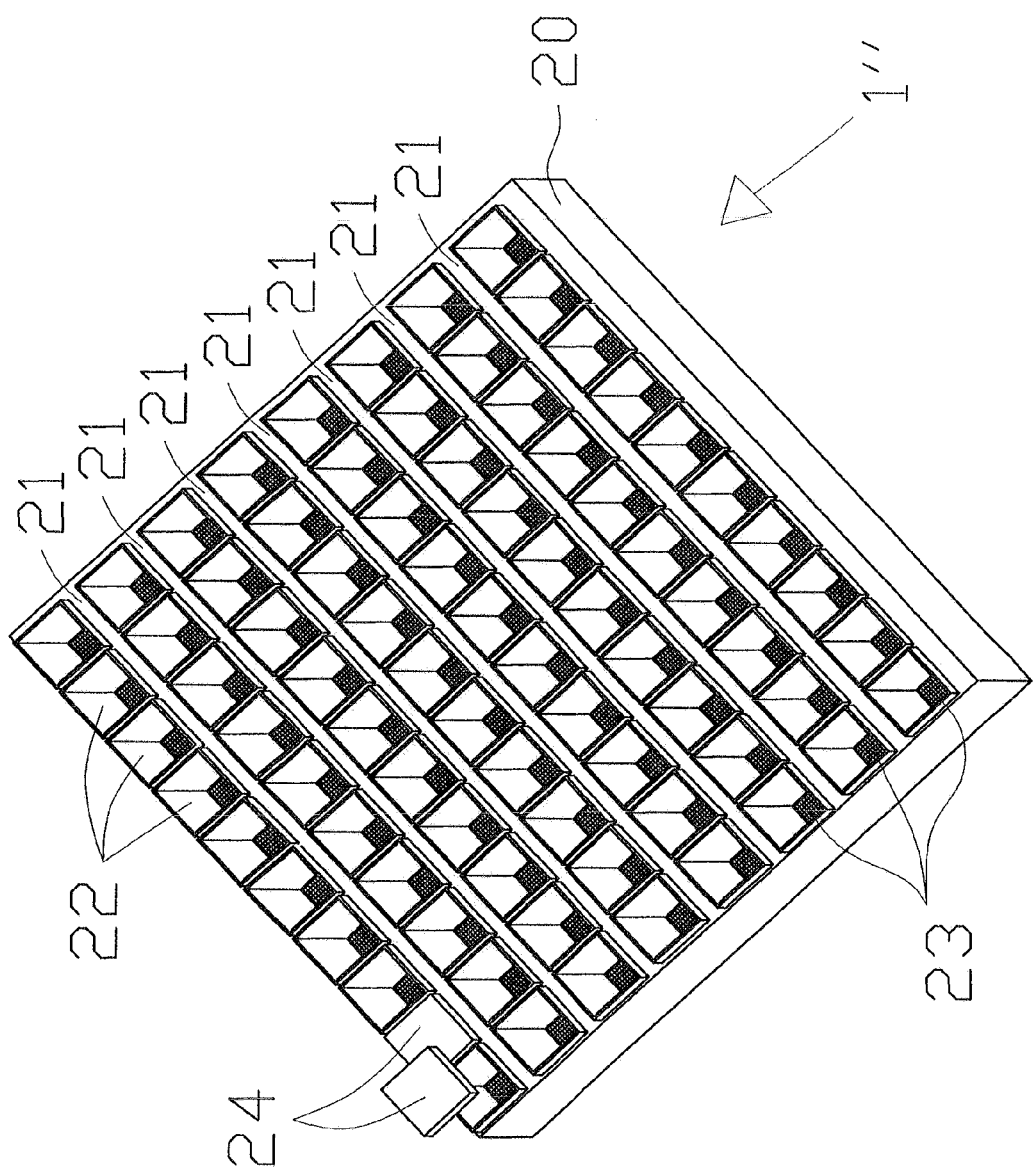
FIG. 10 shows a perspective view of a third embodiment of a receptacle.

In FIG. 10, a third embodiment of a receptacle 1" for receiving fastening elements 50 is illustrated in perspective view. This, again, is a frame 20 which is divided in its interior by a cross-piece 21 or several cross-pieces 21 into a number of compartments 22 corresponding at least to the number of different fastening elements 50 which are to be received. In contrast to the frame 10 according to the second example embodiment, one side of the frame 20 is provided with a grid 23 or a screen, which prevents the fastening elements 50, which have been introduced in the compartments 22, from falling out on this side of the frame 20, and at the same time is permeable to a fluid. The opposite side of each compartment 22 of the frame 20 is closed by a cover 24. This development of the receptacle 1" also makes it possible to feed the fastening elements 50 which are received by the receptacle 1" to a series of treatments, before they are processed as intended, according to their allocation, on components which are to be connected.

All receptacles 1, 1', 1" have the possibility of being connectable and/or coordinated to a control module. The control module is in operative connection or is coordinated with an optical projection system, wherein common data serves to determine the positioning and dimensioning of a fastening element on a component, which is to be allocated to the component at a particular connection site. The control arrangement of the optical projection system refers to a data bank, from which can be taken a clear allocation between the components which are to be joined together to a unit, and the fastening elements 50 necessary for this with regard to their positioning on the components and their number and their dimensioning. On the basis of these data, the receptacles 1, 1', 1" can be charged in such a way that a so-called kit of fastening elements 50 can be allocated to each component. Such a kit can consist of a number and dimensioning of fastening elements 50, which are received by one of the receptacles 1, 1', 1", corresponding to the number and dimensioning, of connection sites of components. In order to make possible for the fitter the clear allocation of such a kit to the components which are to be connected to each other before the processing of the kit, the receptacle 1, 1', 1" is provided with a coding. The coding can be embodied for example as a RFID chip or a machine-readable barcode, but also as a written or printed label which makes it possible for the fitter to clearly identify the kit as belonging to the components.

Furthermore, all the receptacles 1, 1', 1" are embodied identically with regard to the outer dimensions, in order to be able to use uniform shelves or racks for the storage and/or transportation of the receptacles 1, 1', 1". The same applies to an automated charging of the receptacles 1, 1', 1" which is considerably simplified owing to the uniform external dimension of the receptacles 1, 1', 1", as the corresponding devices do not require any adaptation to changing dimensions or contours of the receptacles 1, 1', 1". A further common object is that all receptacles 1, 1', 1" are carried out to be penetrable for fluids.

Figure 11:
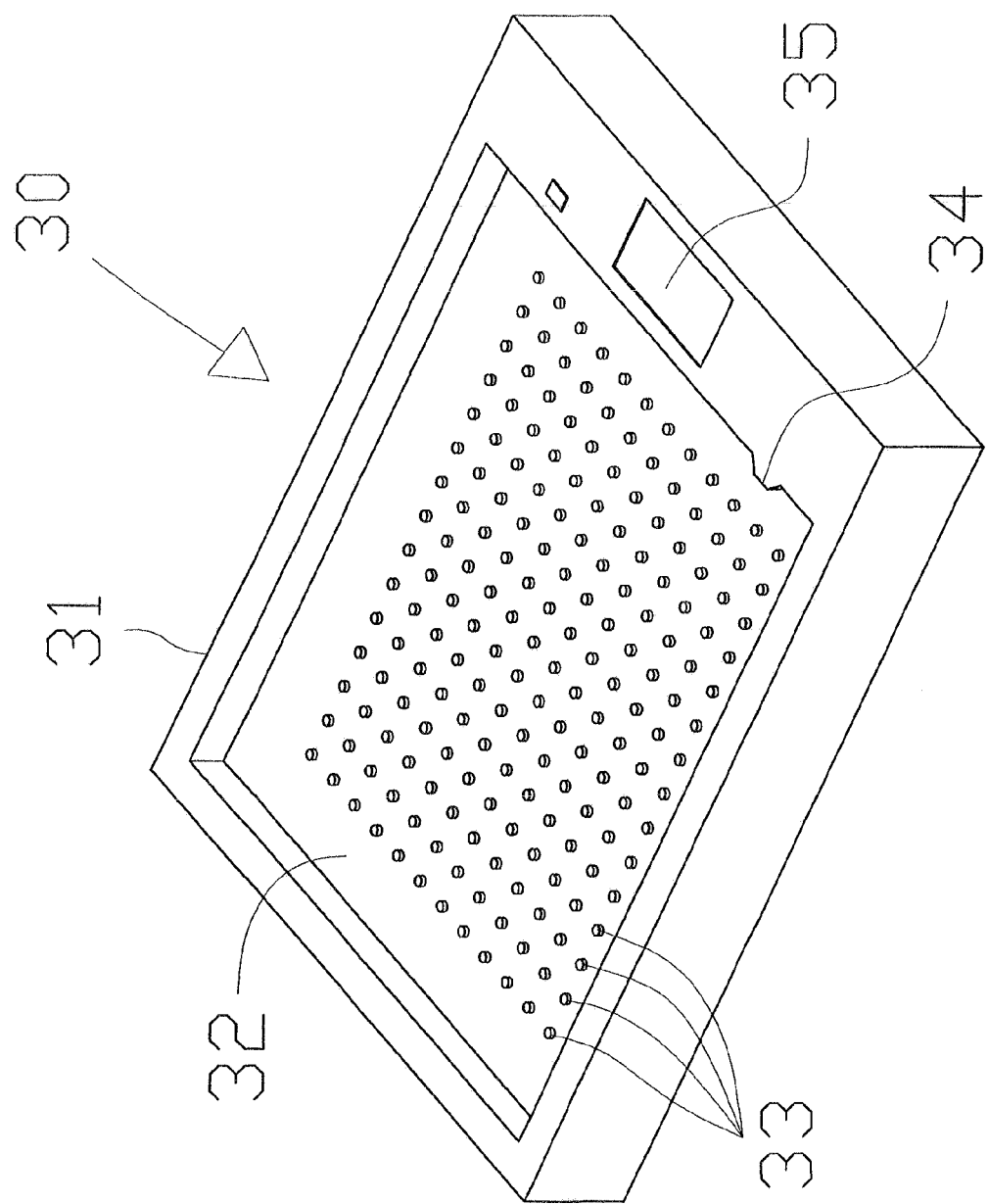
FIG. 11 shows a perspective view of a housing to receive a receptacle according to one of FIG. 1, FIG. 7 or FIG. 10.

In FIG. 11 a perspective view is illustrated of a housing 30, which serves to receive a receptacle 1, 1', 1". The housing 30 is embodied as an upwardly open case 31, on the bottom 32 of which a plurality of lighting means 33 are arranged as identification elements, lying in one plane.

The lighting means 33, embodied as identification elements, can be embodied as light emitting diodes (LED) or as incandescent lamps, in particular as miniature incandescent lamps. The receptacle 1, 1', 1" is able to be inserted into the housing 30 such that the side of the receptacle 1, 1', 1" which is able to be charged with fastening elements 50 is arranged parallel to the lighting means 33. In order to ensure a clear alignment of the receptacle 1, 1', 1" in the housing 30, the housing 30 has in its interior a projection 34 corresponding with the recess 7 on the receptacle 1, 1', 1". The recess 7 and the projection 34 engage into each other in a form-fitting manner, so that the receptacle 1, 1', 1" is only able to be introduced into the housing 30 in a particular position.

Figure 12:
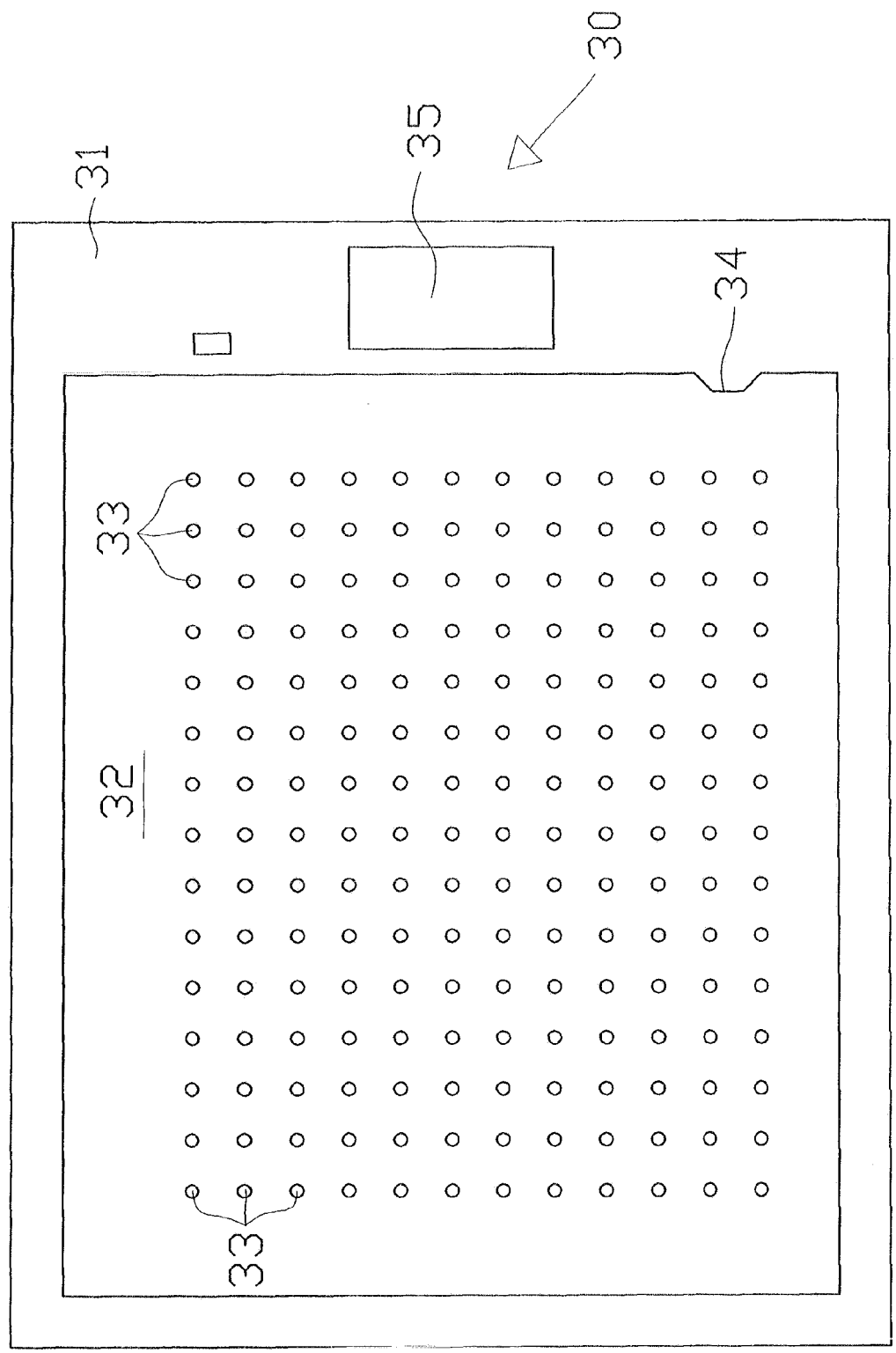
FIG. 12 shows a view from above onto the housing according to FIG. 11.

As is indicated diagrammatically in FIGS. 11 and 12, the housing 30 has a control arrangement 35, which serves for the systematic activation of the lighting means 33 on the bottom 32 of the housing 30. The control arrangement 35 is likewise able to be connected and/or coordinated with the data bank of the projection system for determining and detecting a fastening element to be used at a respective connection site, in order to obtain information concerning the charging of the receptacle 1, 1', 1". Alternatively, information concerning the charging of a receptacle 1, 1', 1" with fastening elements 50 can be deposited in its coding. Through the clear alignment of the receptacle 1, 1', 1" in the housing 30, it is prevented that the receptacle 1, 1', 1" is able to be brought into the housing 30 in a position which does not correspond to the charging of the receptacle 1, 1', 1" deposited in the control arrangement 35 by data reconciliation with the data bank common to the projection system.

The number and the arrangement of the lighting means 33 on the bottom 32 of the housing 30 corresponds at least to the number of the openings 5 in the insert 3 of the receptacle 1 or respectively at least to the number of containers 13 or compartments 22 according to the second or third embodiment of the receptacle 1' or 1". Thus, for example, through the systematic activation of a single lighting means 33 by the control arrangement 35, an individual fastening element arranged in the insert 3 is able to be identified, which the fitter is to work with at a connection site on a component which is clearly identifiable by the projection system. In the case of the receptacle 1, the fastening elements 50 received by the insert 3 are illuminated directly, because respectively a fastening element, the passage 6 in the base element 2 and the associated lighting means 33 are arranged in alignment to each other. The transparent embodiment of the insert 3 makes it possible to see the lighting means 33 and therefore to identify the fastening element.

Through the clear alignment of the receptacle 1, 1', 1" in the housing 30, it is ensured that the charging of the insert 3, the containers 13 or the compartments 22, deposited in the control arrangement 35, and the actual charging of the receptacle 1, 1', 1" coincide.

In a preferred further development, the control arrangement 35 can also activate several lighting means 33 which are united to a field. This can be necessary if a receptacle 1', 1" embodied according to the second or third embodiment is inserted into the housing 30. As these embodiments of the receptacles 1', 1" are divided into compartments 11, 22, the base surface of which is greater than that of a single opening 5 of the insert 3, through the interconnecting of several lighting means 33 an individual container 13 or an individual compartment 22 becomes identifiable, which are filled with several fastening elements 50 of a particular dimensioning, so that the fitter can allocate one of these fastening elements 50 to a connection site on a component which is clearly identifiable by the projection system.

A further option ensues when the lighting means 33 are divided into two or more fields which differ from each other by different colours of the lighting means 33. In this case, two or more fitters can access a shared receptacle 1, 1', 1" simultaneously, wherein they can orient themselves to the respectively different colours of the lighting elements 33 for the clear identification of the fastening elements 50 which are respectively to be worked with.

Figure 13:
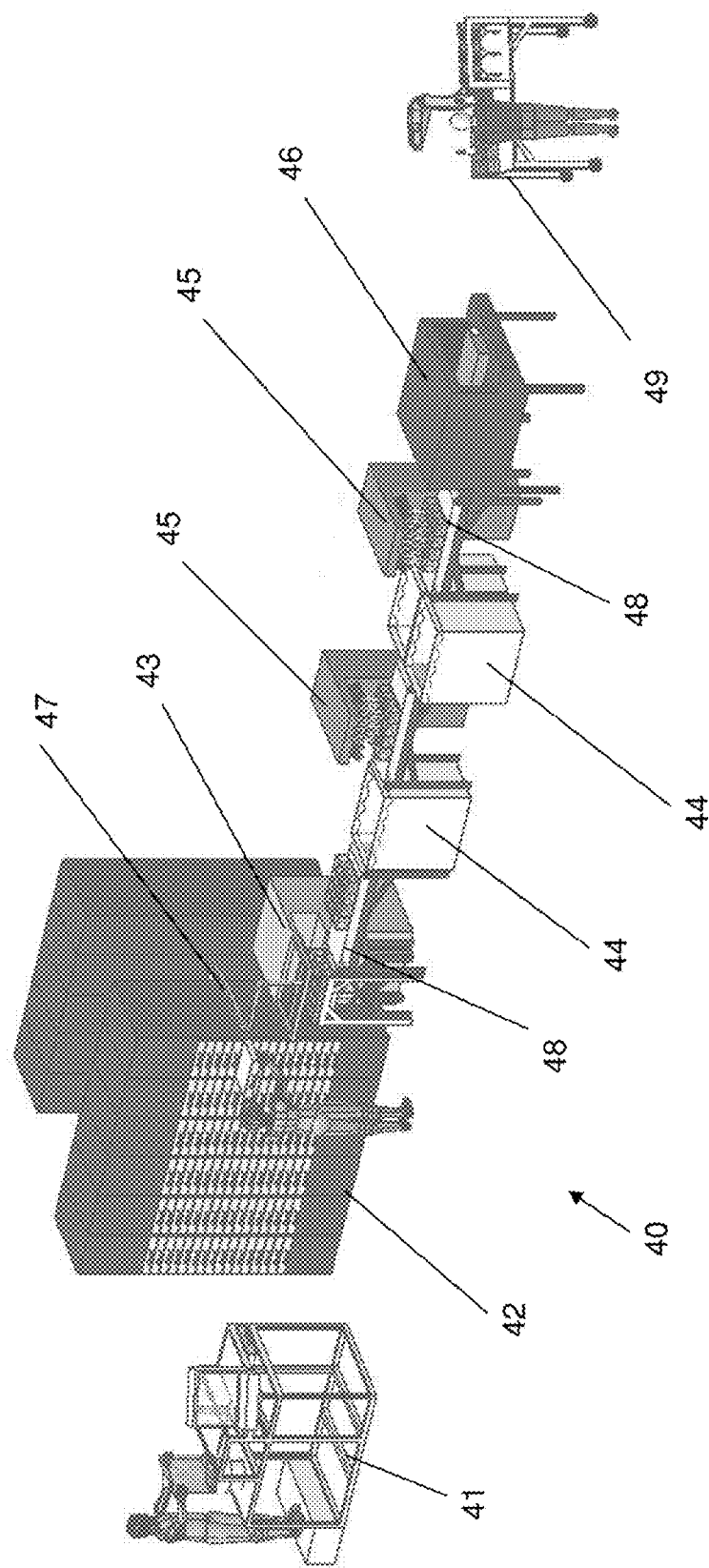
FIG. 13 shows a diagrammatic illustration of a composite for the conveying, charging, treatment and delivery of the receptacles according to the invention.

FIG. 13 represents diagrammatically a conveying and storage system 40 which is used for the conveying and storage of fastening elements 50 and for the charging, treating, marking and delivery of receptacles 1, 1', 1" charged with different fastening elements 50. The conveying and storage system 40 comprises a loading station for cassettes or magazines 41, which are able to be charged with a plurality of identically dimensioned fastening elements 50, and a magazine arrangement 42, which serves for the sorting and storage of the cassettes, charged with identical fastening elements 50, in large quantities. Downstream of the conveying and storage system 40, a preferably PLC OR CNC-controlled charging arrangement 42 is arranged, adjoining which are one or more treatment arrangements 43, or respectively drying arrangements 44 and a marking arrangement 45. The components of the composite are connected with each other by a conveyor line 46 for the fastening elements 50 and transport arrangements 47 for the charged receptacles 1, 1', 1".

The conveying and storage system 40 and the PLC OR CNC-controlled charging arrangement 42 cooperate such that the charging arrangement 42 for the charging of a receptacle 1, 1', 1" as a kit requisitions the respective fastening elements 50 from the conveying and storage system 40, for which, as has already been explained, the data bank of an optical projection system is referred to. The conveying system and storage system 40 feeds the different fastening elements 50 via the conveyor line 45 to the charging arrangement 42. The receptacle 1, 1', 1" which is charged by the charging arrangement 42 is fed by a first transport arrangement 47 to the treatment arrangements 43, in which the fastening elements 50 contained in the receptacles 1, 1', 1" are subjected to a cleaning, a chemical treatment and a drying. Following the treatment, the receptacle 1, 1', 1" is fed to the marking arrangement 45, where the receptacle 1, 1', 1" is provided with a clear coding, as has already been stated. Following the coding of the receptacle 1, 1', 1", the latter is fed to a sealing arrangement 48, in order to seal the receptacle 1, 1', 1".

It will be understood that each of the elements described above, or two or more together, may also find a useful application in other types of constructions differing from the types described above.

While the invention has been illustrated and described as embodied in a system for the identification of different fastening elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system for identification of different fastening elements for connecting of components of a unit to be assembled, the system comprising:
   a receptacle configured for receiving different fastening elements which differ from each other with regard to a parameter selected from the group consisting of shape, size, material and a combination thereof, wherein the different fastening elements with which the receptacle is charged are coordinated with the components which are respectively to be connected, and wherein a number of fastening elements able to be received by the receptacle corresponds at least to a number of connection sites of the components;
   a housing for receiving the receptacle; and
   identification elements displaying individual charging positions of a respective one of the fastening elements in the receptacle, wherein the identification elements are selected from the group consisting essentially of light-emitting diodes, incandescent lamps and both.

2. A system as defined in claim 1, wherein a corresponding one of the identification elements in the receptacle is allocated respectively to a charging position of a respective one of the fastening elements, through which with a respective choice of the respective fastening element the respective fastening element is identifiable in clear allocation to a respective one of the connecting sites of the components.

3. A system as defined in claim 1, further comprising a control arrangement connected with a checking system to determine and detect a respective one of the fastening elements to be used at the respective one of the connecting sites, which serves to control a respective one of the identification elements.

4. A system as defined in claim 1, wherein the identification elements are arranged in a horizontal plane in the housing.

5. A system as defined in claim 1, wherein the receptacle received in the housing is arranged parallel to the identification elements.

6. A system as defined in claim 1, wherein the housing and the receptacle are connected with each other in a form-fitting manner.

7. A system as defined in claim 1, wherein the receptacle is transparent on a side of the receptacle that faces the identification elements.

8. A system as defined in claim 1, wherein the identification elements are miniature incandescent lamps.

9. A system as defined in claim 1, wherein the identification elements are selected from the group consisting essentially of light emitting diodes and incandescent lamps emitting respectively different colored light.

10. A system as defined in claim 1, further comprising a coding element arranged on the receptacle, wherein the housing has a data evaluation arrangement which evaluates the coding element arranged on the receptacle.

11. A system as defined in claim 10, wherein the coding element is an element selected from the group consisting of a RFID chip, a machine-readable code, and a man-readable code applied on the receptacle.

12. A system as defined in claim 1, wherein the receptacle has a base element and a frame-like cover element, further comprising an insert provided between the base element and the cover element and having opening receiving the fastening elements.

13. A system as defined in claim 12, wherein the insert is composed of a transparent material.

14. A system as defined in claim 1, wherein the receptacle is a frame with an interior divided by at least one cross-piece into a number of compartments corresponding at least to a number of the different fastening elements to be received, further comprising a container formed as a receiving element and insertable into a respective one of the compartments to receive identical ones of the fastening elements.

15. A system as defined in claim 14, wherein the container is transparent on a side facing the identification elements.

16. A system as defined in claim 1, wherein the receptacle is a frame with an interior divided by at least one cross-piece into a number of compartments corresponding at least to a number of the different fastening elements to be received, further comprising a least one base element closing the receptacle on one side.

17. A system as defined in claim 16, wherein the base element is transparent.

* * * * *